United States Patent
Masias

(10) Patent No.: US 9,509,024 B2
(45) Date of Patent: Nov. 29, 2016

(54) BATTERY GASSING MITIGATION THROUGH CATALYZED PRECIPITATION

(71) Applicant: Ford Global Technologies, LLC, Dearborn, MI (US)

(72) Inventor: Alvaro Masias, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 14/570,483

(22) Filed: Dec. 15, 2014

(65) Prior Publication Data

US 2016/0172723 A1   Jun. 16, 2016

(51) Int. Cl.
    *H01M 10/52*   (2006.01)
    *H01M 10/42*   (2006.01)

(52) U.S. Cl.
    CPC ....... *H01M 10/523* (2013.01); *H01M 10/4235* (2013.01)

(58) Field of Classification Search
    CPC .................. H01M 10/523; H01M 10/4235
    See application file for complete search history.

(56) References Cited

U.S. PATENT DOCUMENTS

| | | | |
|---|---|---|---|
| 6,013,385 A | 1/2000 | DuBose | |
| 8,507,125 B2 | 8/2013 | Meschter | |
| 2001/0038939 A1* | 11/2001 | Bailey | H01M 2/0267 429/57 |
| 2004/0126647 A1* | 7/2004 | Jones | H01M 10/52 429/57 |
| 2010/0183914 A1* | 7/2010 | Toia | H01M 10/052 429/178 |
| 2010/0285357 A1* | 11/2010 | Christensen | H01M 2/34 429/212 |
| 2013/0095393 A1 | 4/2013 | Friesen et al. | |
| 2013/0175164 A1 | 7/2013 | Smith et al. | |

FOREIGN PATENT DOCUMENTS

| | | | |
|---|---|---|---|
| EP | 2728641 | * | 5/2014 |
| WO | 2013126839 A1 | | 8/2013 |

OTHER PUBLICATIONS

Couttenye, R.A. et al., "Decomposition of the methane with an autocatalytically reduced nickel catalyst", Journal of Catalysis 233 (2005) pp. 317-326.
Shah, Naresh et al., "Hydrogen Production by Catalytic Decomposition of Methane", Energy & Fuels 2001, 15, pp. 1528-1534.
(Continued)

*Primary Examiner* — Ula C Ruddock
*Assistant Examiner* — Thomas Parsons
(74) *Attorney, Agent, or Firm* — Damian Porcari; Brooks Kushman P.C.

(57) ABSTRACT

A secondary battery including a positive and negative electrode, a separator, an electrolyte, and a gas mitigation device is disclosed. The gas mitigation device may include a catalyst configured to catalyze a reaction to form a solid phase material from one or more gases generated during operation of the battery. The battery may also include a protective enclosure surrounding the catalyst, the protective enclosure being gas permeable and liquid impermeable and preventing contact between the catalyst and the electrolyte. The battery may further include a seed material configured to react with the one or more gases to form the solid phase material, which may also be included within the protective enclosure. The catalyst may include nickel nanoparticles or carbonic anhydrase and the seed material may include iron, magnesium, or calcium. In one embodiment, the solid phase material formed is a metal carbonate.

17 Claims, 2 Drawing Sheets

(56) References Cited

OTHER PUBLICATIONS

Mirjafari, P. et al., "Investigating the Application of Enzyme Carbonic Anhydrase for CO2 Sequestration Purposes", Ind. Eng. Chem. Res. 2007, 46, pp. 921-926.

Pham-Huu, Cuong et al., "Large scale synthesis of carbon nanofibers by catalytic decomposition of ethane on nickel nanoclusters decorating carbon nanotubes", Phys. Chem. Chem. Phys., 2002, 4, pp. 514-521.

Park, C. et al., "Catalytic Production of Graphitic Nanorods via the Gas Phase Decomposition of Ethylene over Supported Nickel", Chemical Engineering Communications, 2004, vol. 191, Issue 11, pp. 1456-1472 (Abstract Only).

Gui, Xia et al., "Measurement and Prediction of the Solubility of CO2 in Ester Mixture", Low Carbon Economy, 2011, 2, pp. 26-31.

Hun Seo, Jeong et al., "Gas-Evolution Induced Volume Fraction Changes and Their Effect on the Performance Degradation of Li-Ion Batteries", Electrochemical and Solid-State Letters, 2010, 13 (9), pp. A135-A137.

Bhaduri, G. et al., "Nickel nanoparticles catalyse reversible hydration of carbon dioxide for mineralization carbon capture and storage", Catal. Sci. Technol., 2013, 3, pp. 1234-1239.

Roth, E. P. et al., "How Electrolytes Influence Battery Safety", The Electrochemical Society, 2012, pp. 45-49.

\* cited by examiner

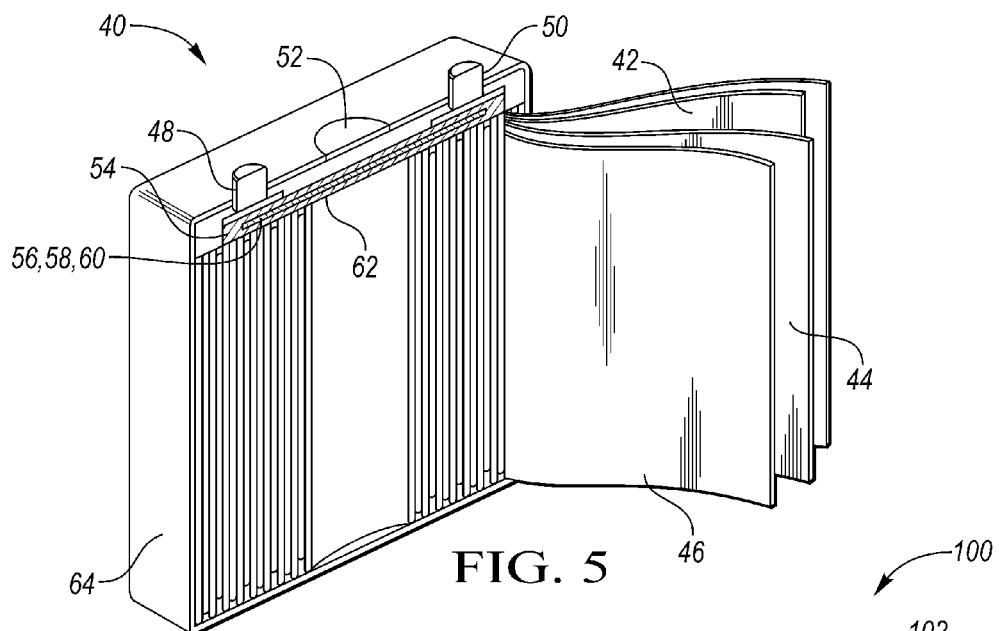
FIG. 5
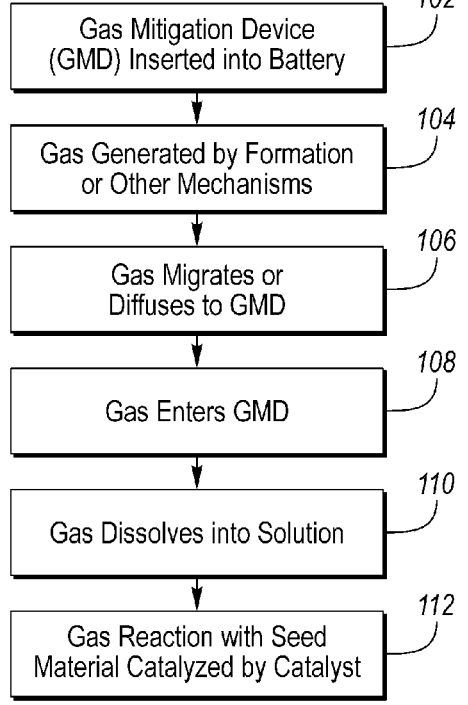
FIG. 7
| Step | Mechanism |
|---|---|
| 1 | $CO_{2(l)} + H_2O \rightarrow H_2CO_3$ |
| 2 | $H_2CO_3 \rightarrow 2H^+ + CO_3^{2-}$ |
| 3 | $CO_3^{2-} + M^{2+} \rightarrow MCO_{3(s)}$ |
FIG. 6

BATTERY GASSING MITIGATION THROUGH CATALYZED PRECIPITATION

TECHNICAL FIELD

The present disclosure relates to battery gassing mitigation, for example, via catalyzed precipitation and phase change.

BACKGROUND

Electric vehicles (e.g., hybrids, plug-in hybrids, and fully electric vehicles) are one of the transportation sector's solutions to meeting future increased fuel economy standards. Electric vehicles often depend on batteries, such as lithium-ion (Li-ion) and nickel metal hydride (NiMH) batteries, to displace some or all of the vehicle's traction or auxiliary electrical loads. During use, sealed (e.g., Li-ion) or re-sealable (e.g., NiMH) batteries may experience gassing as an unintended by-product of either proper or improper operation. Over time, this gassing can generate significant internal pressure in the individual cells of a battery.

This internal pressure can lead to a detrimental cycle of degradation as the pressure change will promote electrode damage. The damage may be particularly harmful in pouch-style cells. In the case of pouch or rigid case cells (e.g., prismatic or cylindrical cans), the pressure may reach such a point that a one-time use pressure release port is opened. Once the pressure release port is activated, the cell is generally considered no longer useable, since the outside environment has likely contaminated the cell internals. Other than single-use pressure release ports, the method of mitigating gassing that is generally used is to put the cells through several formation cycles prior to sealing, thereby allowing any gas generated during these cycles to escape.

SUMMARY

In at least one embodiment, a secondary battery is provided comprising a positive and negative electrode, a separator, an electrolyte, and a gas mitigation device including a catalyst configured to catalyze a reaction to form a solid phase material from one or more gases generated during operation of the battery.

The battery may further include a protective enclosure surrounding the catalyst, the protective enclosure being gas permeable and liquid impermeable and preventing contact between the catalyst and the electrolyte. The battery may also include a seed material configured to react with the one or more gases to form the solid phase material. The seed material may be within the protective enclosure, thereby preventing the catalyst and seed material from contacting the electrolyte. In one embodiment, water may also be included within the protective enclosure.

In one embodiment, the seed material may include at least one of calcium, magnesium, and iron. The one or more gases may include carbon dioxide and the catalyst may be configured to catalyze a formation of at least one of calcium carbonate, magnesium carbonate, and iron carbonate. In one embodiment, the catalyst includes nickel. The nickel may include one or more of pure nickel, a nickel oxide, a nickel alloy, and supported nickel. In another embodiment, the catalyst includes a carbonic anhydrase. The one or more gases may include one or more of ethylene, ethane, and methane and the catalyst may be configured to catalyze a formation of carbon. In one embodiment, the catalyst is located above the positive and negative electrode, such that the one or more gases generated during operation of the battery rise and contact the catalyst.

In at least one embodiment, a lithium-ion battery is provided including a positive and negative electrode, a separator, an electrolyte including an organic solvent and a lithium salt, and a gas mitigation device. The gas mitigation device may include a catalyst configured to catalyze a reaction to form a solid phase material from one or more gases generated in the battery and a protective enclosure surrounding the catalyst, the protective enclosure being gas permeable and liquid impermeable and preventing contact between the catalyst and the electrolyte.

The battery may also include a seed material configured to react with the one or more gases to form the solid phase material. The seed material may include at least one of calcium, magnesium, and iron. In one embodiment, the one or more gases include carbon dioxide and the catalyst is configured to catalyze a formation of at least one of calcium carbonate, magnesium carbonate, and iron carbonate. The catalyst may include nickel nanoparticles or carbonic anhydrase.

In at least one embodiment, a secondary battery is provided including a positive and negative electrode, a separator, an electrolyte, and a gas mitigation device. The gas mitigation device may include a catalyst and a seed material, the catalyst configured to catalyze a reaction to form a solid phase material from the seed material and one or more gases generated during operation of the battery.

The battery may also include a protective enclosure surrounding the catalyst and the seed material, the protective enclosure being gas permeable and liquid impermeable and preventing the catalyst and seed material from contacting the electrolyte. In one embodiment, the seed material includes at least one of calcium, magnesium, and iron.

BRIEF DESCRIPTION OF THE DRAWINGS

FIG. 5 is a schematic view of the inside of a rechargeable battery including a gassing mitigation device, according to an embodiment;

FIG. 6 is a proposed mechanism for the precipitation of a solid phase material from carbon dioxide gas, according to an embodiment; and FIG. 7 is an embodiment of a method of mitigating gas in a rechargeable battery.

DETAILED DESCRIPTION

Figure 1:
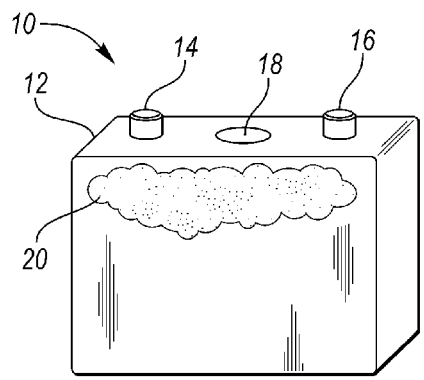
FIG. 1 is a schematic view of a rechargeable battery experiencing gassing.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Battery gassing in rechargeable or secondary batteries (e.g., Li-ion or NiMH) can be very problematic. As described in the background, gassing can lead to internal pressure that may lead to a cycle of degradation. The pressure may also cause a rupture of the cell casing or may require the activation of a one-time pressure release valve. Activation of the pressure release port may essentially render the battery inoperable, since potential contamination of the battery internals may make further operation unsafe. In addition to damaging the battery components, gassing may also reduce the performance of the battery by inhibiting the charge transfers that occur at the solid electrolyte interphase (SEI) layer.

Gas may be generated within a secondary battery via multiple mechanisms. One significant source of gas generation is during the formation of the SEI layer, which may be referred to as formation gas generation. The SEI layer is a protective layer that is formed on the electrodes of Li-ion batteries, particularly carbonaceous anodes, as a result of electrolyte decomposition. The SEI layer is generally formed during the first cycle or first several cycles of the battery. The formation of the SEI layer may affect battery performance and it is important in the prevention or mitigation of additional electrolyte decomposition. Currently, the only method generally in use for addressing gas generation is performing the SEI formation process (e.g., the first cycle or first few cycles) with the battery in an unsealed state, thereby allowing the formation gas to escape.

NiMH batteries also have a formation process. The process generally includes the electrodes/separator becoming fully wet, which involves gas recombinations. NiMH batteries are electrolyte starved designs, while Li-ion batteries are generally excess electrolyte designs. Performing the NiMH formation too quickly or with a separator that is fully wet (and hence has lower gas permeability) could lead to venting as gas recombination is interfered with. Separators generally start around 90% filled with electrolyte and then after formation when the electrodes have absorbed more electrolyte, it may drop to about 70% or so and then about 10-15% at the end of life.

In addition to formation gas, however, battery gassing may also occur through other mechanisms. For example, additional decomposition of the electrolyte, reactions with impurities, overcharge, over-discharge, storage at high temperatures, and others. Gas generation may be continuous throughout the life of the battery and may vary based on the state of charge (SOC) of the battery. Abnormal or abusive conditions may also cause gas formation, such as overcharging, over-discharging, physical damage (e.g., crushing), or car accidents.

The type and volume of gassing that occurs may depend on the battery type and components (e.g., electrodes and electrolyte). The basic components of secondary batteries, such as Li-ion and NiMH batteries, are known to those of ordinary skill in the art and will not be discussed in detail. Secondary batteries generally include a negative electrode (anode), a positive electrode (cathode), a separator, and an electrolyte. Li-ion battery anodes may be formed of carbonaceous materials, such as graphite (natural, artificial, or surface-modified natural), hard carbon, soft carbon, or Si/Sn-enriched graphite. Non-carbonaceous anodes may also be used, such as lithium titanate oxide (LTO). Li-ion battery cathodes may include lithium nickel cobalt aluminum oxide (NCA), lithium nickel manganese cobalt oxide (NMC), lithium manganese spinel oxide (Mn Spinel or LMO), and lithium iron phosphate (LFP) and its derivatives lithium iron manganese phosphate (LFMP). In addition, mixtures of any of two or more of these materials may be used. Li-ion batteries generally include a liquid electrolyte, which may include a lithium salt and an organic solvent. Examples of lithium salts may include $LiPF_6$, $LiBF_4$ or $LiClO_4$. Suitable organic solvents may include ethylene carbonate (EC), dimethyl carbonate (DMC), ethyl methyl carbonate (EMC), diethyl carbonate (DEC), or mixtures thereof. Li-ion battery separators may be formed of any suitable ionically conductive, electrically insulating material, for example, a polyolefin (e.g., polyethylene or polypropylene).

NiMH batteries have the same basic structure as Li-ion batteries, but with different electrode and electrolyte materials and compositions. NiMH anodes are generally an intermetallic compound, such as an $AB_5$, $A_2B_7$, or $AB_2$ compound, and the cathode is generally nickel oxyhydroxide (NiOOH). The electrolyte in NiMH batteries is typically an alkaline electrolyte (aqueous), for example, potassium hydroxide, which may be mixed with lithium and sodium hydroxide. Similar to Li-ion batteries, the separator in NiMH batteries may be a polyolefin, such as polypropylene or polyethylene, which may have been treated for wettability to the electrolyte.

There are multiple gasses that may be produced in Li-ion and NiMH batteries, depending on the battery type, electrode materials, electrolyte composition, impurities present, and other factors. For Li-ion batteries, the most common gasses produced (by volume) include carbon dioxide ($CO_2$), hydrogen ($H_2$), carbon monoxide (CO), methane ($CH_4$), ethylene ($C_2H_4$), and ethane ($C_2H_6$). Carbon dioxide is typically the most generated gas, with hydrogen and ethylene generally being the next highest. For NiMH batteries, the most common gasses produced include oxygen and hydrogen. On charge, the NiMH cathode may produce $O_2$ gas and on discharge, the NiMH anode may absorb $O_2$ and create water, thereby keeping the overall cell pressure balanced during normal use. On overcharge, the cathode may produce excess $O_2$ (e.g., more than can be absorbed by the anode) and on over-discharge, the anode may produce $H_2$ gas.

In the present disclosure, battery gassing mitigation devices/systems and methods are provided that reduce or eliminate gases in secondary batteries through catalyzed precipitation. In at least one embodiment, a catalyst is provided within the battery to catalyze the precipitation of a solid phase material from the gases produced in the battery during formation or battery cycling. By converting the gases to a solid phase material, the volume of the gaseous components is reduced substantially, generally hundreds to thousands of times. By locking the gaseous components into the solid phase, the internal pressure of the battery may be reduced, thereby avoiding possible rupture of the cell or activation of the one-use pressure vent. In addition, removal of the gas may increase the performance of the battery by avoiding the reduction in interfacial area between the active materials and the electrolyte that occurs when gas is produced. The gas mitigation device may also reduce or simplify the controls and processes necessary during the formation process. For example, the battery may be able to be sealed sooner, since the gas mitigation device may handle some or all of the gases generated.

With reference to FIGS. 1-4, a schematic of a prismatic battery 10 is shown. The battery may have a casing 12 and positive and negative terminals 14 and 16, respectively.

While a prismatic battery is shown, the battery 10 may be any known battery type, such as a cylindrical cell or pouch cell. In addition, while the battery 10 is shown with positive and negative terminals 14, 16, the battery could include a single protruding terminal and the case may serve as the other terminal. The battery 10 may include a pressure vent 18, which may vent gases to the atmosphere if a certain threshold pressure is reached within the battery 10. However, as a result of the gas mitigation device of the present disclosure, the battery 10 may no longer require a pressure vent 18. As shown schematically in FIG. 1, gas 20 may be generated within the battery 10 during the formation and/or cycling of the battery. Due to its low density, the gas 20 may rise within the cell and reside within the top of the battery.

Figure 2:
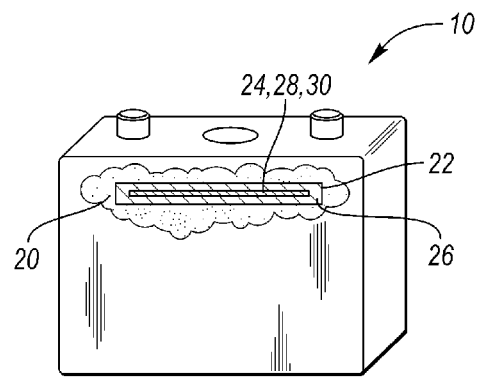
FIG. 2 is a schematic view of a rechargeable battery including a gassing mitigation device, according to an embodiment.
Figure 3:
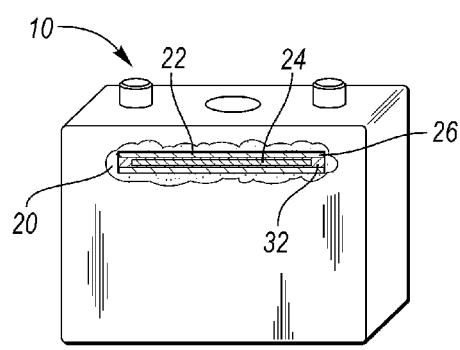
FIG. 3 is a schematic view of the battery of FIG. 2 showing a solid phase precipitate beginning to form and reduced gas volume.
Figure 4:
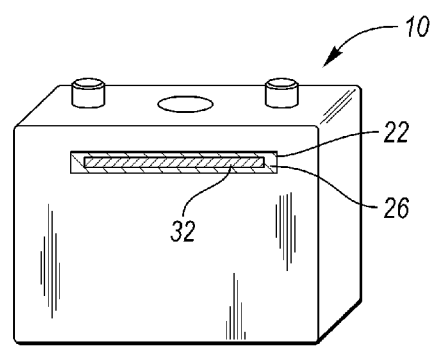
FIG. 4 is a schematic view of the battery of FIG. 2 showing substantially all of the gas converted to a solid phase precipitate by the gassing mitigation device.

With reference to FIGS. 2-4, a battery 10 including a gassing mitigation system or device 22 is shown. The gassing mitigation device (GMD) 22 may include a catalyst component 24 and, optionally, a protective component 26. The catalyst component 24 may include a catalyst or catalytic material 28 that catalyzes a reaction that forms a solid phase material from one or more gases within the battery 10. The catalyst 28 may have any suitable form, such as a powder, a solid or bulk material, a thin film deposited on a substrate, a solution, or others. In addition to including a catalytic material 28 having a catalytic activity, the catalyst component 24 may include a seed or sacrificial material 30 that may react with one or more of the gases to form a solid precipitate material 32. Similar to the catalyst 28, the seed material 30 may have any suitable form, including a powder, a solid or bulk material, a thin film deposited on a substrate, a solution, or others.

The catalyst component 24 may be enclosed or surrounded by a protective component 26. The protective component 26 may have any suitable form, such as a flexible sleeve or pouch or a rigid enclosure. The protective component 26 may prevent any material inside (e.g., the catalyst component 24) from leaching into and contaminating or otherwise impacting, contacting, or reacting with the battery components, such as the electrolyte or electrode active materials. In one embodiment, the protective component 26 may be gas permeable and liquid impermeable. The terms gas permeable and liquid impermeable may be with reference to the materials in the battery and may not be absolute terms. Accordingly, the protective component 26 may allow the gases produced within the cell to pass through it and react with the catalyst component 24 to form a solid precipitate 32. However, the protective component 26 may prevent the liquid electrolyte from entering the inside of the GMD 22 and reacting with the catalyst component 24 (or any liquid inside the GMD 22 from exiting). Therefore, the protective component 26 allows the GMD 22 to remove the gases produced by catalyzed precipitation, but it prevents the contamination of the battery cell by the components of the catalyst component 24 or the precipitate 32 that forms. The protective component 26 may be formed of any gas permeable and liquid impermeable material. Non-limiting examples of materials that may be suitable for the protective component 26 include spun high-density polyethylene (HDPE) (e.g., Tyvek® from DuPont™) or spun polypropylene (PP) tri-layers (e.g., DELTA®-VENT S from Cosella-Dorken or GreenGuard® C2000).

With reference to FIG. 2, a battery 10 including a gassing mitigation device 22 is schematically shown with gases 20 produced but prior to any reaction with the catalyst component 24. In FIG. 3, the gases 20 have begun reacting with the catalyst 28 and the seed material 30 (if present) to form a solid precipitate 32. Accordingly, the gas cloud 20 has shrunk due to the reaction and phase change of the gases. In FIG. 4, substantially all of the gas 20 has reacted with the catalyst component 24 to form the solid precipitate 32. During the reaction, the seed material 30, if present, may be consumed by the reaction, as illustrated by the shrinking catalyst component 24 in FIGS. 3 and 4. While FIG. 4 shows just a precipitate 32 remaining, the catalytic material 28 may remain unconsumed after the reaction. FIGS. 2-4 schematically illustrate the effect of the inclusion of the GMD 22. However, in practice, the gas 20 may be reacted and converted to the solid phase as it is produced, rather than first accumulating as shown in FIG. 2.

While FIG. 4 shows that all of the gas 20 may react and be converted to a solid precipitate 32, some gases may remain in the battery 10. As described above, numerous types of gases may be generated within the battery and the catalyst 28 and seed material 30 may not cause all of the gas or gas types to be converted into a solid precipitate 32. In one embodiment, the catalytic material 28 may be a material that catalyzes the reaction of one or more of the gases in the battery into a solid phase. The catalyst component 24 may also include more than one catalytic material 28, thereby increasing the number of gases 20 that may be reacted and converted to a solid phase. Depending on the gases being produced and the type of battery or battery components, the seed material 30 may or may not be required. For example, if the reactants necessary to form the solid precipitate 32 are present within the battery (either as intended component materials or as impurities), then a seed material 30 may not be required. However, if the reactants necessary are not present, or are not present in sufficient quantity, then a seed material 30 may be included to facilitate the reaction of the gases 20 to form a solid phase precipitate 32. Similar to the catalyst 28, the seed material may react with one or more gases that may be generated in the battery. In addition, multiple seed materials 30 may be included in the catalyst component 24 in order to form one or more precipitates 32. In at least one embodiment, the seed material includes a metal (e.g., a pure metal or an alloy) or a metal oxide. In one embodiment, the seed material includes one or more of calcium (Ca), magnesium (Mg), or iron (Fe).

With reference to FIG. 5, a schematic of the interior of a prismatic secondary battery 40 is shown, which may be a Li-ion battery. The battery 40 may include a plurality of anode layers 42, separator layers 44, and cathode layers 46, as described above and as known to those of ordinary skill in the art. The battery 40 may also have positive and negative terminals 48 and 50, respectively, and a one-use pressure vent 52. As described above, however, the configuration of the battery 40 may vary, as understood by one of ordinary skill in the art. Also, due to the inclusion of the gassing mitigation device, the vent 52 may be eliminated in some embodiments. The battery 40 may include a gassing mitigation device (GMD) 54, similar to GMD 22 described above. The GMD 54 may include a catalyst component 56, which may include one or more catalytic material 58 and one or more seed material 60. The catalyst component 56 may react with gases produced by the battery 40 to create a precipitate layer, similar to FIGS. 2-4. The catalyst component 56 may be surrounded, enveloped, or encased by a protective component 62, similar to component 26. The battery 40 may be enclosed in a case 64, which may be a pouch, prismatic, or cylindrical case, or any other case type known in the art.

The GMD 54 may be disposed within the battery 40 in any suitable location. Batteries do not generally have a lot of free or unused space, particularly in or around the electrode layers (sometimes known as a jelly-roll). As described above, gas that is generated will generally rise to the top of the battery due to its low density. The "top" of the battery may be relative to how the battery is oriented or configured when in use. As used herein, top may mean the portion of the battery with the highest elevation when installed or in use. Batteries are often inserted or installed with their terminals extending upward or on top. In addition, there may be space between the electrode assembly and the battery terminals that may accommodate the GMD 54. Accordingly, in at least one embodiment, the GMD 54 may be disposed between the electrode assembly (e.g., the electrode layers and separator layers) and the battery terminals. In another embodiment, the GMD 54 may be disposed at or near the top of the battery 40. The GMD 54 may extend over or adjacent to at least a portion or all of the electrode assembly. In a prismatic cell, the GMD 54 may extend parallel to one of the faces of the cell. In a cylindrical cell, the GMD 54 may extend parallel to the end faces of the cylinder. Therefore, when gas is generated, it may naturally diffuse or migrate to the portion of the battery 40 that includes the GMD 54. In addition, placing the GMD above, over, or adjacent to the electrode assembly eliminates or reduces the impact of the GMD 54 on the electrochemical processes occurring in the battery 40.

As described above, the type of gases and their relative rates or volumes of generation may depend on the battery type, battery components, battery operating conditions, external forces, or other factors. For example, the most commonly generated gases in Li-ion batteries are generally carbon dioxide, hydrogen, and ethylene. Accordingly, in at least one embodiment, a catalyst (or catalysts) may be included in the catalyst component that catalyzes the reaction of one or more of the generated gases into a solid phase precipitate. Carbon dioxide is typically the most-generated gas in a Li-ion battery. Therefore, catalyst materials, seed materials, and a candidate mechanism are described herein with the conversion of carbon dioxide to a solid phase as an example. However, one of ordinary skill in the art will recognize that, based on the teachings of the present disclosure, other potential catalyst materials, seed materials, and mechanisms may be employed to target other gases.

Sequestering gaseous carbon dioxide by converting it into a solid phase has been an active area of research regarding climate change and reducing the presence of greenhouse gases in the atmosphere. Two catalysts that have been shown to facilitate the conversion of carbon dioxide into a solid phase material are nickel nanoparticles and carbonic anhydrases. To produce a stable solid precipitate, such as a carbonate, a seed material may be provided in the catalyst component. In one embodiment, the seed material may be a metal (pure or alloy) or a metal oxide. Non-limiting examples of materials that may be suitable seed materials include calcium, magnesium, iron, their oxides or alloys, or mixtures thereof. Accordingly, carbon dioxide may be reacted to ultimately form a carbonate, such as a metal carbonate (e.g., calcium, magnesium, or iron carbonate).

A candidate mechanism for the catalyzed precipitation of carbon dioxide is shown in FIG. 6. In the first step, carbon dioxide, which may be in solution, may react with liquid water to form carbonic acid, $H_2CO_3$. In embodiments where there is no protective component, the water in step one may be water that is produced by reactions within the battery cell (intended or unintended). Water may be an undesired byproduct of reactions between the electrolyte and the electrodes in Li-ion batteries. However, this water may play a role in the removal or reduction of gas in the battery component via a catalyzed phase change. In embodiments where there is a protective component, such as a liquid impermeable and gas permeable sleeve or envelope, liquid water may be included in the protective component. For example, liquid water may be included within the protective components 26, 62 (e.g., as part of the catalyst component or seed material). The carbon dioxide generated within the battery may enter the protective component, due to its gas permeability, but the liquid water may be retained inside. When the gas enters the protective component, it may be dissolved within the water, thereby facilitating the reaction shown in step one.

The amount of water included may depend on the amount of catalyst material and/or seed material or the amount of gas expected to be converted to a solid phase. The amount of water may be determined based on the stoichiometric amount needed to react with a certain amount of gas or other reactants. In addition to water, a buffer solution may also be included, since the mechanism includes the production of $H^+$ ions. Accordingly, to keep the reaction going, a buffer solution may be included to stabilize the pH of the solution. Any suitable buffer solution may be used, such as tris (hydroxymethyl)aminomethane. As an example, if $CO_2$ is produced at a rate of 1.18 g per Ah of the battery, 0.482 g of water may be included per Ah in order to react stoichiometrically. In one embodiment, 0.1 to 1.0 g/Ah or water may be included in the battery, or any sub-range therein. For example, 0.2 to 0.8 g/Ah, 0.25 to 0.75 g/Ah, 0.3 to 0.7 g/Ah, 0.35 to 0.6 g/Ah, or 0.4 to 0.6 g/Ah of water may be included in the battery.

In step two, the carbonic acid may dissociate into hydrogen ions and a carbonate ion. There may be an intermediate stage where the carbonic acid dissociates into a hydrogen ion and bicarbonate, however, that stage is not shown in the mechanism. In step three, the carbonate ion reacts with a metal ion to form a metal carbonate, such as calcium, magnesium, or iron carbonate. The source of metal ions may be a pure metal, metal alloy, or metal oxide, as described above for the seed material 30. The metal carbonate is a solid phase that may be inert or non-reactive. Accordingly, the carbon dioxide gas generated during the formation or cycling of the battery may be locked up or sequestered in the form of a solid phase carbonate having a volume that is several orders of magnitude smaller than the gas generated. For example, the density of $CO_2$ gas is 0.00198 g/cm$^3$, while the densities of calcium carbonate, iron carbonate, and magnesium carbonate are 2.71 g/cm$^3$, 3.96 g/cm$^3$, and 2.96 g/cm$^3$, respectively.

The reaction in step one is generally the slowest and may be the rate-limiting step of the overall mechanism. Accordingly, the catalytic material 28, 58 may be a material that increases the speed of this reaction. As described above, carbonic anhydrases and nickel nanoparticles are examples of suitable catalytic materials. Carbonic anhydrases (CA) are enzymes that naturally occur in plants and animals (e.g., bovine), or they may be synthetically or artificially produced or modified. Naturally occurring carbonic anhydrases generally facilitate the conversion of carbon dioxide to bicarbonate (and vice versa) to maintain the acid-base balance in animal/plant tissues or help transport carbon dioxide out of tissues. Any carbonic anhydrase that catalyzes a reaction of carbon dioxide, such as in step one, may be suitable as the catalytic material in the present disclosure. For example, the carbonic anhydrase may be selected from one of the five naturally occurring families of carbonic anhydrases, alpha (α), beta (β), gamma (γ), delta (δ), and epsilon (ε). The CA may also be a synthetic or modified carbonic anhydrase. The carbonic anhydrase may be included in the catalyst component as a solution.

In addition to, or instead of, carbonic anhydrase, nickel (Ni) nanoparticles may also be included as a catalytic material. The Ni nanoparticles may catalyze the same reaction step(s) as described above for carbonic anhydrases (e.g., step 1 in FIG. 6). The term "nanoparticles" may correspond to any particle having a size of less than one micron (μm). The nanoparticles may have a mean size of one nm to hundreds of nm, for example, 1 to 500 nm, 10 to 500 nm, 1 to 250 nm, 10 to 250 nm, 1 to 150 nm, 50 to 150 nm, or others. The Ni nanoparticles may be in the form of a loose powder or may be deposited on a substrate. If the particles are in the form of a loose powder, they may be mixed with a powder of the seed material (if present) in order to reduce the distance between the reactants and the catalyst and increase the surface area available for reaction. If the particles are deposited on a substrate, the seed material may also be deposited on the substrate, for similar reasons as above with respect to the loose powder. The Ni nanoparticles may be pure nickel, a nickel oxide, or a nickel alloy.

Any appreciable reduction in the amount of gas present in the battery may be beneficial for reducing internal pressure and mitigating the adverse effects on battery performance. Therefore, any suitable amount of catalytic material may be included in the gassing mitigation device. However, to catalyze the reaction of a substantial amount or substantially all of the gas generated in the battery, a certain quantity of catalyst may be included. The amount of catalyst may be determined based on multiple factors, such as the predicted conditions of the battery, the battery size, the amount of battery charge (e.g., amp-hours), or others. In one embodiment, 5 to 25 mg of carbonic anhydrase may be included in the GMD per amp-hour (Ah) of battery charge (capacity), or any sub-range therein. For example, 10 to 20 mg/Ah, 12 to 18 mg/Ah, or about 15 mg/Ah of carbonic anhydrase may be included. In one embodiment, based on abusive conditions, about 14.66 mg/Ah of CA may be included to fully catalyze the generated carbon dioxide. Accordingly, for a 5 Ah battery (e.g., a hybrid electric vehicle battery), about 73 mg of CA may be included and for a 25 Ah battery (e.g., an electric vehicle battery), about 366 mg of CA may be included.

In one embodiment, 1 to 25 mg of nickel nanoparticles may be included in the GMD per amp-hour (Ah) of battery charge (capacity), or any sub-range therein. For example, 1 to 20 mg/Ah, 2 to 15 mg/Ah, 2 to 10 mg/Ah, 3 to 8 mg/Ah, or about 6 mg/Ah of nickel nanoparticles may be included. In one embodiment, based on abusive conditions, about 6.2 mg/Ah of nickel nanoparticles may be included to fully catalyze the generated carbon dioxide. Accordingly, for a 5 Ah battery (e.g., a hybrid electric vehicle battery), about 31.2 mg of CA may be included and for a 25 Ah battery (e.g., an electric vehicle battery), about 155.4 mg of CA may be included.

Alternatively, a total catalyst quantity may be included in the gassing mitigation device that is not a function of battery size or charge. In one embodiment, the battery may include at least 5 mg of carbonic anhydrase, for example, at least 15, 25, 50, 100, 250, 500, or 1,000 mg of CA. Stated as a range, the battery may include from 5 to 1,000 mg of carbonic anhydrase, or any sub-range therein, such as 15 to 500 mg, 25 to 500 mg or 50 to 500 mg of CA. Similarly, in one embodiment, the battery may include at least 1 mg of nickel nanoparticles, for example, at least 5, 10, 25, 50, 100, 150, 250, 500, or 1,000 mg of nickel nanoparticles. Stated as a range, the battery may include from 1 to 1,000 mg of nickel nanoparticles, or any sub-range therein, such as 1 to 250 mg, 1 to 150 mg, 1 to 50 mg, 5 to 250 mg, 25 to 250 mg, or 50 to 250 mg of nickel nanoparticles. Quantities outside of these ranges may also be used, however, lower values may provide inadequate catalytic activity for some battery sizes and higher values may have diminishing returns, as far as catalytic activity, or may begin to displace too much space within the battery or may unnecessarily increase costs.

As described above, other catalytic materials and/or seed materials may be used to precipitate a solid phase material from one or more gases other than carbon dioxide. Catalysts and seed materials may be included to catalyze the precipitation of hydrogen ($H_2$), carbon monoxide (CO), methane ($CH_4$), ethylene ($C_2H_4$), and/or ethane ($C_2H_6$) into a solid phase. For example, catalysts that precipitate various forms of solid carbon (e.g., nanotubes, filaments, nanofibers) from carbon monoxide, methane, ethylene, and/or ethane may be used. Non-limiting examples of such catalysts may include metallic nickel, nickel oxide (NiO), silica ($SiO_2$), Fe-M (M=Pd, Mo, or Ni), or mixtures thereof. The catalysts may be un-supported or supported, for example on alumina, silica, or carbon (e.g., nanotubes, nanofibers). Based on the non-limiting examples described above regarding the precipitation of carbon dioxide, one of ordinary skill in the art may incorporate catalytic materials, seed materials, and any additional materials needed (e.g., a solvent, such as water) to catalyze the precipitation of one or more gases generated in a Li-ion, NiMH, or other rechargeable battery.

With reference to FIG. 7, an embodiment of a method 100 of mitigating or reducing gas is a secondary battery is disclosed. Similar to above, the method 100 is described with reference to a lithium-ion battery and carbon dioxide gas, however, one of ordinary skill in the art will understand, based on the present disclosure, that other catalysts and/or seed materials may be incorporated into the method, that other gases may be mitigated, or that certain steps may be rearranged, modified, added, or removed, as necessary. In step 102, a gas mitigation device (GMD) may be inserted into a secondary battery, such as a lithium-ion battery. As described above, the GMD may be placed or located above the electrode assembly. In step 104, one or more gases are generated in the battery, for example, during the formation process or by other mechanisms, such as electrolyte decomposition or reactions with impurities. The gases may include carbon dioxide, carbon monoxide, hydrogen, methane, ethane, ethylene, or others.

In step 106, the gas or gases may migrate or diffuse to the GMD. If, as described above, the GMD is located above the electrode assembly, then the gas migration/diffusion may be aided by the reduced density of the gases compared to the other components of the battery. At step 108, the gases may enter the GMD. As described above, the GMD may include a protective enclosure that is gas permeable and liquid impermeable (at least with respect to the battery components). The protective enclosure may therefore isolate or separate the contents of the GMD from the rest of the battery components (e.g., electrolyte, electrode active materials, etc.). By preventing contact between the contents of the GMD (e.g., catalyst, seed material, water/solvent, buffer) and the battery components, such as the electrolyte, contamination of the battery cell may be prevented.

In step 110, the gas or gases may dissolve into solution within the GMD. As described above, water or another solvent may be provided within the protective enclosure (and prevented from escaping). Therefore, gases, such as carbon dioxide, may enter solution in the water. In step 112, the gas or gases may react to form a solid phase precipitate. That catalyst may catalyze at least one reaction to facilitate or speed up the formation of the precipitate. For example, if the gas is carbon dioxide, the reaction mechanism may follow the steps in FIG. 6. The carbon dioxide in solution may react with water to form carbonic acid, which may then dissociate into hydrogen ions and a carbonate ion. The carbonate ion may then react with metal ions of the seed material to form a metal carbonate, such as iron, magnesium, or calcium carbonate. The solid precipitate may be retained within the protective enclosure to prevent contact with the battery components, such as the electrolyte. Accordingly, the method 100 may mitigate or eliminate gases produced during the life cycle of a secondary battery by causing the gases to react and form a solid phase by catalyzed precipitation.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A secondary battery comprising:
a positive and negative electrode;
a separator;
an electrolyte;
a gas mitigation device including a catalyst configured to catalyze a reaction to form a solid phase material from one or more gases generated during operation of the battery;
a seed material configured to react with the one or more gases to form the solid phase material; and
a protective enclosure surrounding the catalyst and the seed material.

2. The battery of claim 1 further comprising, the protective enclosure being gas permeable and liquid impermeable and preventing contact between the catalyst and the electrolyte.

3. The battery of claim 1, further comprising water within the protective enclosure.

4. The battery of claim 1, wherein the seed material includes at least one of calcium, magnesium, and iron.

5. The battery of claim 4, wherein the one or more gases include carbon dioxide and the catalyst is configured to catalyze a formation of at least one of calcium carbonate, magnesium carbonate, and iron carbonate.

6. The battery of claim 1, wherein the catalyst includes nickel.

7. The battery of claim 6, wherein the nickel includes one or more of pure nickel, a nickel oxide, a nickel alloy, and supported nickel.

8. The battery of claim 1, wherein the catalyst includes a carbonic anhydrase.

9. The battery of claim 1, wherein the one or more gases include one or more of ethylene, ethane, and methane and the catalyst is configured to catalyze a formation of carbon.

10. The battery of claim 1, wherein the catalyst is located above the positive and negative electrode such that the one or more gases generated during operation of the battery will rise and contact the catalyst.

11. A lithium-ion battery comprising:
a positive and negative electrode;
a separator;
an electrolyte including an organic solvent and a lithium salt; and
a gas mitigation device including:
a catalyst configured to catalyze a reaction to form a solid phase material from one or more gases generated in the battery;
a seed material configured to react with the one or more gases to form the solid phase material; and
a protective enclosure surrounding the catalyst, the protective enclosure being gas permeable and liquid impermeable and preventing contact between the catalyst and the electrolyte.

12. The battery of claim 11, wherein the seed material includes at least one of calcium, magnesium, and iron.

13. The battery of claim 12, wherein the one or more gases include carbon dioxide and the catalyst is configured to catalyze a formation of at least one of calcium carbonate, magnesium carbonate, and iron carbonate.

14. The battery of claim 11, wherein the catalyst includes nickel nanoparticles or carbonic anhydrase.

15. A secondary battery comprising: a positive and negative electrode; a separator; an electrolyte; and a gas mitigation device including a catalyst and a seed material, the catalyst configured to catalyze a reaction to form a solid phase material from the seed material and one or more gases generated during operation of the battery.

16. The battery of claim 15 further comprising a protective enclosure surrounding the catalyst and the seed material, the protective enclosure being gas permeable and liquid impermeable and preventing the catalyst and seed material from contacting the electrolyte.

17. The battery of claim 15, wherein the seed material includes at least one of calcium, magnesium, and iron.

* * * * *